United States Patent
Endou et al.

(10) Patent No.: US 7,294,955 B2
(45) Date of Patent: Nov. 13, 2007

(54) ELECTRODE FOR ELECTRON GUN AND ELECTRON GUN USING SAME

(75) Inventors: Morinobu Endou, Susaka (JP); Yoshihisa Suda, Maebashi (JP); Osamu Shimizu, Tano-gun (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 11/121,107

(22) Filed: May 4, 2005

(65) Prior Publication Data
US 2005/0206294 A1    Sep. 22, 2005

Related U.S. Application Data

(62) Division of application No. 10/414,019, filed on Apr. 16, 2003, now Pat. No. 6,902,457.

(30) Foreign Application Priority Data
Apr. 19, 2002 (JP) .............................. 2002-118035

(51) Int. Cl.
*H01J 1/00* (2006.01)
*H01J 29/46* (2006.01)
*H01J 29/50* (2006.01)

(52) U.S. Cl. ...................... 313/446; 313/448; 313/351; 313/309; 313/336

(58) Field of Classification Search ................ 313/446, 313/447, 448, 309, 336, 351, 497
See application file for complete search history.

(56) References Cited

U.S. PATENT DOCUMENTS

| 5,391,433 | A | | 2/1995 | Kawakubo et al. |
| 5,491,375 | A | | 2/1996 | Iwasaki |
| 5,821,679 | A | * | 10/1998 | Makishima ................. 313/310 |
| 5,984,752 | A | * | 11/1999 | Tanaka et al. ................. 445/51 |
| 6,100,628 | A | * | 8/2000 | Coll et al. ................... 313/310 |
| 6,239,547 | B1 | * | 5/2001 | Uemura et al. ............. 313/495 |
| 6,580,223 | B2 | | 6/2003 | Konishi et al. |
| 6,630,772 | B1 | | 10/2003 | Bower et al. |
| 6,882,094 | B2 | * | 4/2005 | Dimitrijevic et al. ... 313/346 R |
| 2003/0096104 | A1 | | 5/2003 | Tobita et al. |

FOREIGN PATENT DOCUMENTS

| JP | 7-182969 A | 7/1995 |
| JP | 10-199398 A | 7/1998 |
| JP | 2000-215786 A | 8/2000 |
| JP | 2002-100278 A | 4/2002 |

* cited by examiner

*Primary Examiner*—Ashok Patel
(74) *Attorney, Agent, or Firm*—Foley & Lardner LLP

(57) ABSTRACT

An electrode for an electron gun and an electron gun using same are provided which make use of stable carbon material having small work function and which permit orientation control to be achieved and which can be manufactured at a low cost. An electrode for an electron gun uses carbon electrode(s) formed from amorphous carbon and carbon nanotubes or carbon nanofibers and molded in linear shape. The carbon electrode is obtained by mixing a resin composition such as chlorinated vinyl chloride resin, furan resin, etc., which forms non-graphitizing carbon after carbonizing, with a carbon powder such as carbon nanotubes or carbon nanofibers and, after extrusion, molding and carbonizing the molding obtained.

7 Claims, 3 Drawing Sheets

ELECTRODE FOR ELECTRON GUN AND ELECTRON GUN USING SAME

This application is a Divisional Application of U.S. patent application Ser. No. 10/414,019, filed Apr. 16, 2003 now U.S. Pat. No. 6,902,457.

BACKGROUND OF THE INVENTION

1. Field of the Invention

The present invention relates to an electrode for an electron gun and to an electron gun using the same.

2. Description of the Related Art

Recently, a carbonaceous material, such as carbon nanotubes which have a work function of a low value and are very stable, has been attracting increasing attention as an electrode material for an electron gun or a cold cathode type electron emission element (FED: Field Emitter Device), as is described, for example, in Japanese Patent Publication No.10-199398.

In order to form an electrode by fixing carbon nanotubes on a substrate of glass, Si, a metal plate, or the like, a method has been conventionally known in which carbon nanotubes are mixed into silver paste or the like and the mixture is applied in liquid form to the substrate by means of screen printing method. An alternative method, as described in the above-mentioned patent publication, is also known in which a layer of carbon nanotubes is directly formed on the substrate by means of a CVD (Chemical Vapor Deposition) method.

A method is also disclosed, although carbon nanotubes are not used, in Japanese Patent Publication No. 2002-100278, in which a carbon plate having graphite crystal grown homogeneously and highly controlled in one direction in amorphous carbon is bonded via an adhesive layer to a substrate to form an emitter.

In the above-mentioned method of using screen printing in liquid form, it is difficult to orientate the carbon nanotubes in one direction. This method has a further disadvantage that blending ratio of carbon nanotube cannot be increased because an increase in viscosity, with an increasing proportion of carbon nanotubes, prohibits screen printing being carried out. The method using CVD to form a layer of carbon nanotubes directly on a substrate has a disadvantage that it takes too many steps and too much time to be carried out at a reasonable cost.

The same problem arises with a hot cathode type electron gun such as a cathode ray tube (CRT) as with above-mentioned cold cathode type electron gun.

SUMMARY OF THE INVENTION

It is therefore an object of the present invention to provide an electrode for an electron gun and an electron gun using same which uses a carbonaceous material having a small work function and exhibiting excellent stability and which permits orientation to be highly controlled and can be manufactured at a low cost.

In accordance with the present invention, there is provided an electrode for an electron gun comprising one or more carbonaceous electrodes that are molded in the shape of pillar or cone, and a substrate supporting the carbonaceous electrodes.

The above-mentioned carbonaceous electrode preferably contains amorphous carbon and carbon powder.

The above-mentioned carbon powder preferably contains carbon nanotubes or carbon nanofibers.

The above-mentioned carbonaceous electrode preferably further contains a metal or metalloid compound.

In accordance with the present invention, there is provided an electron gun comprising the above-mentioned electrode for an electron gun, an anode for pulling out electrons from the electrode, and a grid for controlling the emission of electrons.

The electron gun may further comprise a heater provided on the back surface of the electrode for giving impact to electrons.

The carbonaceous electrode used in the present invention is fabricated by mixing a resin composition having good moldability and exhibiting high yield of carbon residue after carbonizing, carbon powder, and one or more metal compounds, or metalloid compounds, as required, and molding the mixture in a desired shape such as a cylinder with circular cross-section, rectangular shape with a square cross-section, in the shape of a coil, a cone, a hollow cylinder, or the like, in accordance with the size and shape of the intended device such as a FED or a cathode ray tube, and for the purpose of controlling the electron emission characteristics or current density and, then, carbonizing the molding. The electrode for an electron gun of the present invention is obtained by mounting a single such carbonaceous electrode or an array of plural carbonaceous electrodes on a substrate.

Carbon black, graphite, coke powder, or the like may be used as the carbon powder. The type and the amount of the carbon powder used are suitably chosen depending upon the intended shape and resistance value and the discharge characteristics of the electrode. Carbon powder of a single type or a mixture of two or more types of carbon powders may be used. Graphite powder is preferably used advantageously in view of the simplicity of shape control. In order to facilitate molding and structure control, graphite powder is preferably selected from the group consisting of highly ordered pyrolytic graphite (HOPG) with average diameter not greater than 100 μm, kish graphite, natural graphite, synthetic graphite and vapor grown carbon fiber with diameter of 200 nm or less.

A carbon nanotube, or a carbon nanofiber, is a tubular material formed from hexagonal graphite crystal lattice plane rolled up in a "single wall" tube having no defect or in a "multiwall" tube having these single wall tubes laminated in a nested form. When this tube is 15 nm or less in diameter and several tens nm~several μm in length, it is referred to as carbon nanotube, and when diameter is in the range of about 15 nm~about 100 nm, it is referred to as carbon nanofiber. A carbon nanotube, or a carbon nanofiber, is formed by various methods including an arc discharge method, a vapor phase pyrolysis method, a laser evaporation method, an electrolysis method, a fluid catalyst method, or the like. Recently, a polymer blend method has been proposed to form hollow tubular fibers, or solid fibers in some cases. A carbon nanotube, or a carbon nanofiber, in the broadest sense of the terms, including both a hollow tube and a solid fiber, is used in the present invention.

The above-mentioned metal or metalloid compounds include generally available metal carbides, metalloid carbides, metal borides, metalloid borides, metal silicides, metalloid silicides, metal nitrides, metalloid nitrides, metal oxides, metalloid oxides, and the like. The type and the amount of the metal or metalloid compounds may be suitably chosen depending upon the intended shape and resistance value of the electrode. The metal or metalloid compounds may be used alone or in mixture of two or more. In view of the controllability of the resistance value and of the thermal resistance, boron carbide, silicon carbide, or boron nitride, in particular, is preferably used.

The above-mentioned resin composition that has good moldability and exhibits a high yield of carbon residue after carbonizing, is preferably a polymer resin which can be converted to non-graphitizing carbon that is hardly graphitized during usage at high temperature. It is desired that the resin composition gives rise to cross-linking bonds between molecules during heating in the preliminary stage of carbonization so as to exhibit high yield of carbon residue after firing, and is capable of packing graphite powder, metal or metalloid compounds and shrinking during firing for carbonization. Thus, the resin composition is a heat curable resin or a thermoplastic resin or a composite material composed of two or more of them. Heat curable resins that can be used in the present invention include phenol resins, furan resins, epoxy resins, xylene resins, benzooxazine resins, unsaturated polyester resins, melamine resins, alkyd resins, copna resins, and the like. In view of small thermal structure change in aging, furan resins and phenol resins are preferably used. Thermoplastic resins that can be used in the present invention include polychlolinated vinyl chloride resins, polyacrylonitrile, polyamide, polyimide, etc. In view of moldability and ease of handling when a composite material is formed with furan resins or phenol resins, polychlolinated vinyl chloride resin is preferably used.

After polymer resins are selected to form amorphous carbon after carbonizing, graphite powder, and metal compounds or metalloid compounds are suitably selected in order to obtain necessary characteristics as an electron emitter of an electron gun, these components are thoroughly mixed and dispersed using a mixer. Then, using a molding machine commonly used in plastic molding such as a film pelletizer or an extrusion molding machine, the mixture is molded into desired shape such as a cylinder of circular cross-section, rectangular shape of square cross-section, or in the shape of a coil, a cone, a hollow cylinder, or the like, while controlling the graphite powder, metal compounds or metalloid compounds so as to be oriented in one direction. After the obtained molding is subjected to a precursor processing and solidification processing in an air oven, it is fired in an inert gas atmosphere such as nitrogen, argon, etc., with controlled rate of temperature rise to complete carbonization. A carbonaceous electrode used for an electron gun and consisting of carbon composite material comprising amorphous carbon, graphite powder, carbon nanotubes, carbon nanofibers, metal compounds and semi-metal compounds, is thus obtained.

Carbonization is carried out in an inert gas atmosphere or in vacuum by heating and raising temperature up to about 700~2800° C. When the rate of temperature rise during carbonization is too large, the molding may be deformed in shape or defects such as fine cracks may be produced. Therefore, it is recommended that temperature be raised at a rate not greater than 50° C. per hour up to 500° C., and not greater than 100° C. per hour thereafter.

In the present invention, in order to obtain good thermal resistance at high temperature, the carbonization processing by firing is carried out in an inert atmosphere or in vacuum up to temperature that is higher than the usage temperature as an electron emitter by 260° C.~500° C., preferably by about 300° C., thereby permitting more stable characteristics for electron emission and longer useful life to be achieved with a lower consumption of electric power.

In the carbonaceous electrode used for an electron gun according to the present invention, the amorphous carbon which is obtained by carbonization of a polymer resin having good moldability contains edge portion of graphite, carbon nanotubes, or carbon nanofibers having excellent electron emissivity which are homogeneously oriented in one direction to form a composite body of amorphous carbon and graphite, carbon nanotubes, or carbon nanofibers. By thus forming a composite body, the edge portion of graphite or sharp pointed form of carbon nanotubes or carbon nanofibers having excellent electron emissivity are exposed evenly and uniformly so that an electrode of any shape can be formed as an electron emitter so as to have a small work function and a low threshold voltage for electron emission. Since it has excellent thermal resistance, rush current is small in repeated use and a stable discharge current can be obtained to permit a long useful life.

Thus, by using a carbonaceous electrode formed either from a single carbonaceous electrode in the shape of cylinder of circular cross-section, in a rectangular shape of square cross-section, in the shape of a coil, a cone, or a hollow cylinder, or plural carbonaceous electrodes arranged in an array as required, an electron gun having long useful life and high efficiency with low electric power consumption can be realized.

The present invention will be described below in further detail with reference to drawings showing examples thereof. It is to be understood that the present invention is by no means restricted by the examples described below.

DESCRIPTION OF THE PREFERRED EMBODIMENTS

EXAMPLE 1

To a composition consisting of 40 parts of chlorinated vinyl chloride resin (T-741; manufactured by Nippon Carbide Industries Co.) and 20 parts of furan resin (VF303; manufactured by Hitachi Chemical Co.), 40 parts of natural graphite powder (mean particle diameter of 5 μm; manufactured by Nippon Graphite Industries Co.) and 20 parts of diallyl phthalate monomer as a plasticizer were added, dispersed and mixed, and molded in the shape of fine filament by extrusion molding, and then carbonized in a nitrogen gas atmosphere with 1000° C., and further in argon gas atmosphere with 2000° C. to obtain a carbonaceous electrode of 0.2 mm in diameter.

Figure 1:
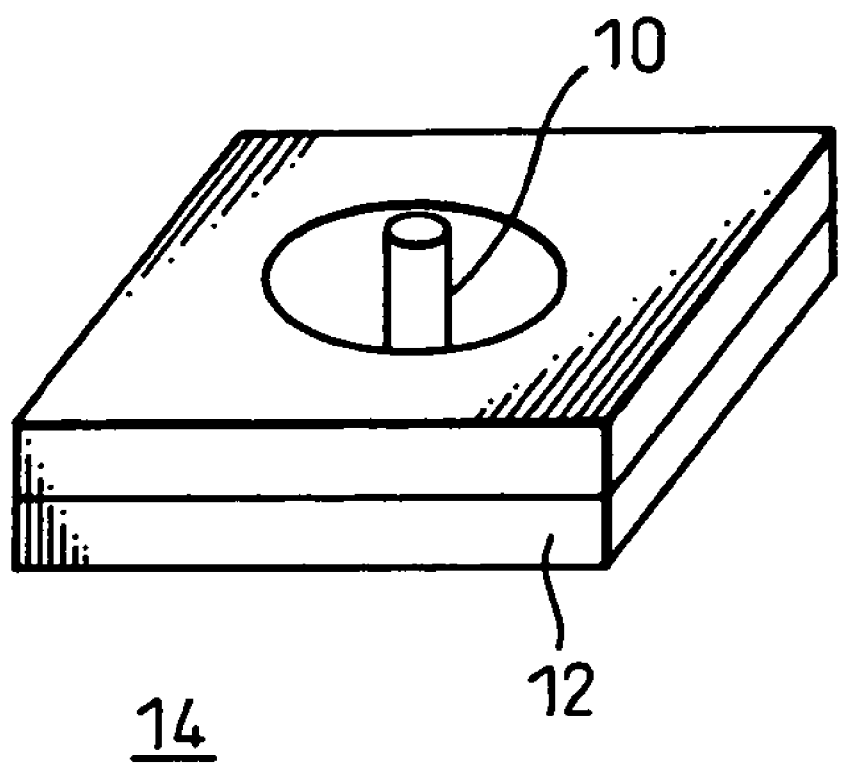
FIG. 1 is a perspective view showing the basic construction of a field emission type cold cathode unit.
Figure 2:
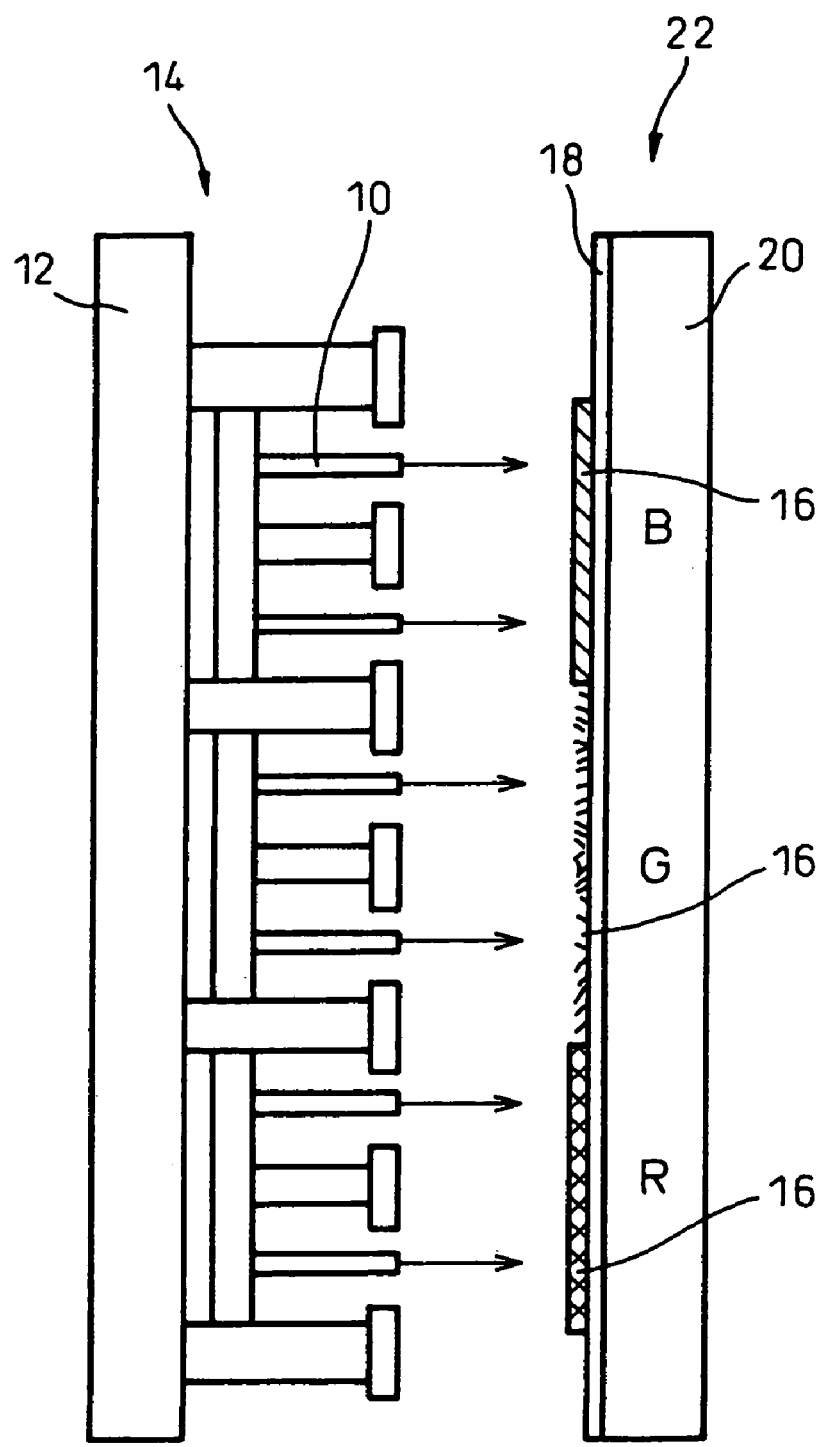
FIG. 2 is a cross-sectional view showing the field emission type cold cathode units arranged in an array.

FIGS. 1 and 2 show the construction of the essential part of a field emission type cold cathode. FIG. 1 shows the basic construction of the unit, and FIG. 2 shows a cross-sectional view of the cathode units arranged in an array.

As shown in the Figures, the obtained cylindrical carbonaceous electrodes 10 were arranged on an insulating substrate 12 and bonded thereto to form a cathode. An anode electrode plate 22 consisting of a glass substrate 20 with a fluorescent body 16 and a transparent conductive film 18 coated thereon was provided on the opposing side. When an electric field was applied between the two electrodes in vacuum, light emission from the fluorescent body was observed and confirmed all over the surface.

EXAMPLE 2

To a composition consisting of 50 parts of chlorinated vinyl chloride resin (T-741; manufactured by Nippon Carbide Industries Co.) and 50 parts of carbon nanofiber (mean diameter of 100 nm; manufactured by Showa Denko Co.), 20 parts of diallyl phthalate monomer as a plasticizer were added, dispersed and mixed, and molded by extrusion molding, and then carbonized in nitrogen gas atmosphere with 1000° C., and further in vacuum with 1500° C. to obtain cylindrical carbonaceous electrodes of 0.5 mm in diameter.

The obtained cylindrical carbonaceous electrodes were used as in Example 1 above, and when an electric field was applied between the two electrodes in vacuum, light emission from the fluorescent body was observed and confirmed all over the surface.

EXAMPLE 3

To a composition consisting of 50 parts of chlorinated vinyl chloride resin (T-741; manufactured by Nippon Carbide Industries Co.), 25 parts of natural graphite powder (mean particle diameter of 5 μm; manufactured by Nippon Graphite Industries Co.) and 25 parts of carbon nanofiber (mean diameter of 100 nm; manufactured by Showa Denko Co.), 20 parts of diallyl phthalate monomer as a plasticizer were added, dispersed and mixed, and molded by extrusion molding, and then carbonized in nitrogen gas atmosphere with 1000° C., and further in vacuum with 1500° C., and after machining, cone-shaped carbonaceous electrodes were obtained.

The obtained cone-shaped carbonaceous electrodes were used as in Example 1 above, and when an electric field was applied between the two electrodes in vacuum, light emission from the fluorescent body was observed and confirmed all over the surface.

EXAMPLE 4

To a composition consisting of 50 parts of chlorinated vinyl chloride resin (T-741; manufactured by Nippon Carbide Industries Co.) and 50 parts of carbon nanofiber (mean diameter of 100 nm; manufactured by Showa Denko Co.), 20 parts of diallyl phthalate monomer as a plasticizer were added, dispersed and mixed, and molded by extrusion molding, and then carbonized in nitrogen gas atmosphere with 1000° C., and further in vacuum with 1500° C. to obtain cylindrical carbonaceous electrodes.

Figure 3:
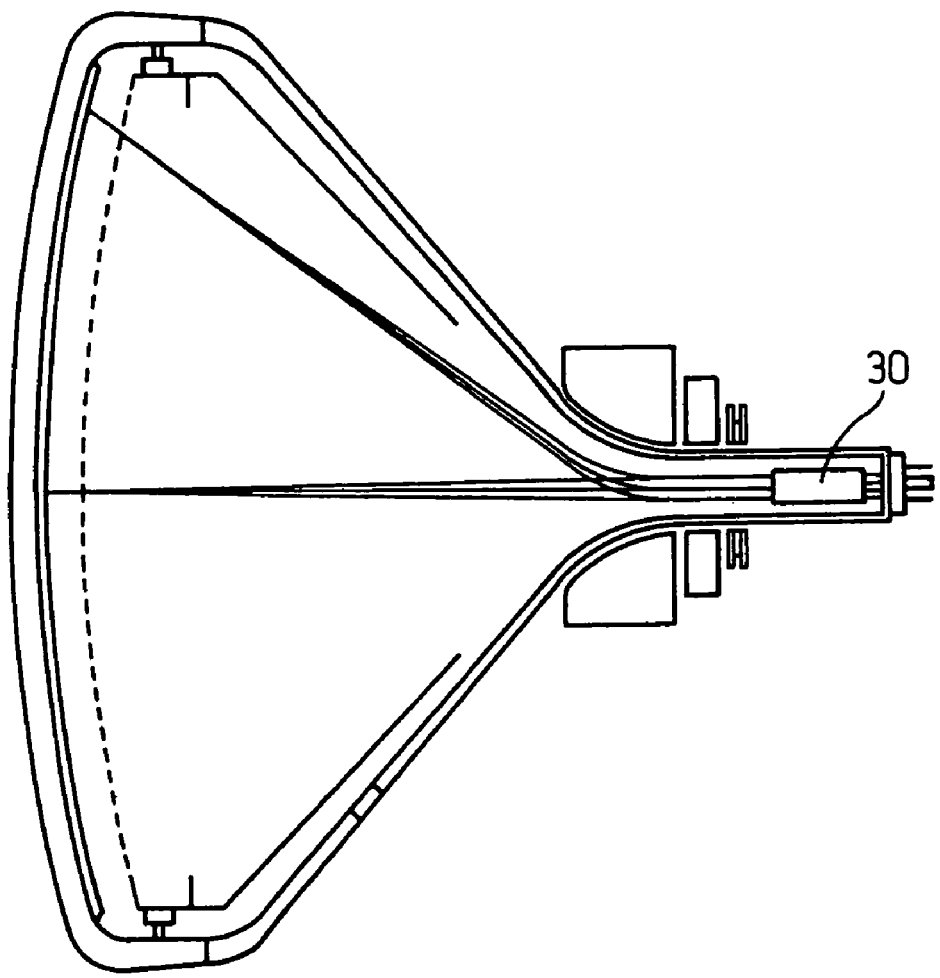
FIG. 3 is a sectional view showing a cathode ray tube.

The obtained cylindrical carbonaceous electrode was used as an electrode for an electron gun in a cathode ray tube (CRT) as shown in FIG. 3, and when an electric field was applied, generation of an electron beam from the carbonaceous electrode was confirmed.

As has been described in the foregoing, the carbonaceous electrode of the present invention formed from a single unit of carbonaceous electrode in the shape of cylinder of circular cross-section, in rectangular shape of square cross section, in the shape of a coil, a cone or a hollow cylinder, or a plurality of units arranged in an array as required, permits a FED to be realized that is capable of operating in a low vacuum, stably at large electric current and at low voltage, and is also capable of operating individually, and when used in cathode ray tubes, the carbonaceous electrode of the present invention improves efficiency, permits the electric power consumption to be reduced, and can be manufactured easily, and therefore has great industrial value.

What is claimed is:

1. An electrode for an electron gun comprising:
   one or more pillar-shaped or cone-shaped carbonaceous electrode(s); and
   a substrate for supporting the carbonaceous electrode(s), wherein said carbonaceous electrode contains amorphous carbon and carbon powder, and wherein the amorphous carbon includes non-graphitizing carbon.

2. An electrode for an electron gun according to claim 1, wherein said carbon powder contains carbon nanotubes or carbon nanofibers.

3. An electrode for an electron gun according to claim 1, wherein said carbonaceous electrode further contains metal or metalloid compounds.

4. An electron gun comprising:
   an electrode for an electron gun comprising:
   one or more pillar-shaped or cone-shaped carbonaceous electrode(s); and
   a substrate for supporting the carbonaceous electrode(s);
   an anode for pulling out electrons from the electrode(s); and
   a grid for controlling the emission of electrons, wherein said carbonaceous electrode contains amorphous carbon and carbon powder, and wherein the amorphous carbon includes non-graphitizing carbon.

5. An electron gun according to claim 4, wherein said carbon powder contains carbon nanotubes or carbon nanofibers.

6. An electron gun according to claim 4, wherein said carbonaceous electrode further contains metal or metalloid compounds.

7. An electron gun according to claim 4, further comprising a heater provided on a back surface of the electrode for giving impact to electrons.

* * * * *